United States Patent
Wang et al.

(10) Patent No.: US 11,111,409 B2
(45) Date of Patent: Sep. 7, 2021

(54) COATING COMPOSITION COMPRISING SELF-CROSSLINKABLE CORE-SHELL PARTICLES AND IMPARTING IMPROVED STAIN RESISTANCE

(71) Applicant: PPG Industries Ohio, Inc., Cleveland, OH (US)

(72) Inventors: Yu Wang, Pittsburgh, PA (US); Steven E Surma, Lower Burrell, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 197 days.

(21) Appl. No.: 16/238,547

(22) Filed: Jan. 3, 2019

(65) Prior Publication Data
US 2020/0216712 A1    Jul. 9, 2020

(51) Int. Cl.
| | |
|---|---|
| *B32B 5/16* | (2006.01) |
| *C09D 175/06* | (2006.01) |
| *C04B 41/48* | (2006.01) |
| *C04B 41/63* | (2006.01) |
| *C04B 41/71* | (2006.01) |
| *C09D 5/00* | (2006.01) |
| *C09D 133/26* | (2006.01) |

(52) U.S. Cl.
CPC ........ *C09D 175/06* (2013.01); *C04B 41/4834* (2013.01); *C04B 41/4884* (2013.01); *C04B 41/63* (2013.01); *C04B 41/71* (2013.01); *C09D 5/00* (2013.01); *C09D 133/26* (2013.01); *Y10T 428/2998* (2015.01)

(58) Field of Classification Search
CPC .. B05D 7/24; B05D 2503/00; B05D 2401/20; C09D 175/04; C09D 179/06; Y10T 428/2998
USPC ....................................................... 428/427
See application file for complete search history.

(56) References Cited

U.S. PATENT DOCUMENTS

| | | |
|---|---|---|
| 4,598,121 A | 7/1986 | Disteldorf et al. |
| 4,650,718 A | 3/1987 | Simpson et al. |
| 4,888,383 A | 12/1989 | Huybrechts |
| 4,933,056 A | 6/1990 | Corrigan et al. |
| 4,983,662 A | 1/1991 | Overbeek et al. |
| 5,141,983 A | 8/1992 | Hasegawa et al. |
| 5,147,926 A | 9/1992 | Meichsner et al. |
| 5,348,997 A | 9/1994 | Kato et al. |
| 5,472,996 A | 12/1995 | Hayashi et al. |
| 5,530,043 A | 6/1996 | Zawacky et al. |
| 5,571,861 A | 11/1996 | Klein et al. |
| 5,614,582 A | 3/1997 | Hori et al. |
| 5,623,016 A | 4/1997 | Klein et al. |
| 5,760,107 A | 6/1998 | Valko et al. |
| 5,814,410 A | 9/1998 | Singer et al. |
| 5,820,987 A | 10/1998 | Kaufman et al. |
| 5,891,981 A | 4/1999 | Mauer et al. |
| 5,912,293 A | 6/1999 | Stockwell et al. |
| 6,063,861 A | 5/2000 | Irle et al. |
| 6,239,209 B1 | 5/2001 | Yang et al. |
| 6,455,631 B1 | 9/2002 | Blum et al. |
| 6,555,625 B1 | 4/2003 | Overbeek et al. |
| 6,579,932 B1 | 6/2003 | Schipper et al. |
| 6,635,706 B1 | 10/2003 | Petschke et al. |
| 6,706,818 B2 | 3/2004 | Ishihara et al. |
| 6,762,240 B2 | 7/2004 | Swarup et al. |
| 6,765,056 B2 | 7/2004 | Hobel et al. |
| 7,476,705 B2 | 1/2009 | Pajerski |
| 7,531,074 B2 | 5/2009 | Purdy et al. |
| 7,576,157 B2 | 8/2009 | Pajerski |
| 8,283,405 B2 | 10/2012 | Yukawa |
| 8,436,084 B2 | 5/2013 | Kawaguchi et al. |
| 8,461,253 B2 | 6/2013 | Ambrose et al. |
| 8,846,156 B2 | 9/2014 | Swarup et al. |
| 8,900,667 B2 | 12/2014 | Boggs et al. |
| 8,901,244 B2 | 12/2014 | Pajerski |
| 9,102,783 B2 | 8/2015 | Yagi et al. |
| 9,127,125 B2 | 9/2015 | Hartig et al. |
| 9,149,835 B2 | 10/2015 | Swarup et al. |
| 9,303,181 B2 * | 4/2016 | Zhang .................. C09D 133/14 |
| 9,365,739 B2 | 6/2016 | Dombrowski et al. |

(Continued)

FOREIGN PATENT DOCUMENTS

| | | |
|---|---|---|
| CA | 2186776 A1 | 3/1998 |
| CA | 2219835 A1 | 5/1998 |

(Continued)

OTHER PUBLICATIONS

Evonik, Surfynol Surfactants (Year: 2020).*
Hirose et al., "The structure and properties of core-shell type acrylic-polyurethane hybrid aqueous emulsions", Progress in Organic Coatings, 1997, pp. 157-169, vol. 31.
Kessel et al., "The diacetone acrylamide corsslinking reaction and its influence on the film formation of an acrylic latex", J. Coat. Technol. Res, 2008, pp. 285-297, vol. 5, No. 3.
Li et al., "Synthesis and characterization of self-crosslinked polyurethane/polyacrylate composite emulsion based on carbonyl-hydrazide reaction", Journal of Polymer Research, 2013, pp. 1-9, vol. 20, No. 270.
Okamoto et al., "Urethane/acrylic composite polymer emulsions", Progress in Organic Coatings, 1996, pp. 175-182, vol. 29.

(Continued)

*Primary Examiner* — Hoa (Holly) Le
(74) *Attorney, Agent, or Firm* — Michael J. Grese

(57) ABSTRACT

A coating composition includes: an aqueous dispersion of self-crosslinkable core-shell particles, where the core-shell particles include (1) a polymeric core at least partially encapsulated by (2) a polymeric shell having urethane linkages, keto and/or aldo functional groups, and hydrazide functional groups, where the polymeric core is covalently bonded to at least a portion of the polymeric shell, and a hydrophobic additive including a wax and/or a silicon-containing compound, where the hydrophobic additive is non-reactive with the polymeric core and the polymeric shell. A substrate coated with a coating formed from the coating composition and a method for improving stain resistance of a substrate are also disclosed.

22 Claims, No Drawings

(56) References Cited

U.S. PATENT DOCUMENTS

| | | |
|---|---|---|
| 10,066,116 B2 | 9/2018 | Hibben et al. |
| 10,081,696 B2 | 9/2018 | Chen et al. |
| 10,577,518 B2 * | 3/2020 | Xu .................. C08F 283/008 |
| 2001/0024693 A1 | 9/2001 | Morimoto et al. |
| 2004/0096590 A1 | 5/2004 | Sasaki et al. |
| 2006/0121204 A1 | 6/2006 | Nakae et al. |
| 2006/0148980 A1 | 7/2006 | Tielemans et al. |
| 2009/0117396 A1 | 5/2009 | Furusawa et al. |
| 2009/0137334 A1 | 5/2009 | Malhotra |
| 2009/0137734 A1 * | 5/2009 | Pajerski ............... C08G 18/36 524/591 |
| 2011/0070374 A1 | 3/2011 | Ambrose et al. |
| 2011/0300389 A1 | 12/2011 | Kitagawa et al. |
| 2012/0021228 A1 | 1/2012 | Kitagawa et al. |
| 2014/0128533 A1 | 5/2014 | Vanmeulder et al. |
| 2014/0323639 A1 * | 10/2014 | Zhang ............... C08G 18/4825 524/507 |
| 2014/0377468 A1 | 12/2014 | Swarup et al. |
| 2015/0045491 A1 | 2/2015 | Zhang et al. |
| 2015/0307738 A1 | 10/2015 | Schumucker et al. |
| 2016/0068706 A1 | 3/2016 | Swarup et al. |
| 2016/0244629 A1 | 8/2016 | Xu et al. |
| 2016/0264815 A1 * | 9/2016 | Joege ................. B05D 3/0473 |
| 2016/0319151 A1 * | 11/2016 | Steinmetz ............ B05D 7/572 |
| 2017/0037263 A1 * | 2/2017 | Iyer ..................... C09D 133/24 |
| 2018/0230327 A1 | 8/2018 | Kanda |
| 2019/0002709 A1 * | 1/2019 | Xu ..................... C08F 283/008 |
| 2020/0017709 A1 | 1/2020 | Wang et al. |
| 2020/0079973 A1 * | 3/2020 | Wang .................. C08L 75/14 |

FOREIGN PATENT DOCUMENTS

| | | |
|---|---|---|
| CN | 101240101 A | 8/2008 |
| CN | 101759841 A | 6/2010 |
| CN | 102199254 A | 9/2011 |
| CN | 102492281 A | 6/2012 |
| CN | 105175661 A | 12/2015 |
| JP | 5320299 A | 12/1993 |
| JP | 5339542 A | 12/1993 |
| JP | 782456 A | 3/1995 |
| JP | 7188353 A | 7/1995 |
| JP | 7242855 A | 9/1995 |
| JP | 10139839 A | 5/1998 |
| JP | 10259356 A | 9/1998 |
| JP | 10265735 A | 10/1998 |
| JP | H10298491 A | 11/1998 |
| JP | 2000345092 A | 12/2000 |
| JP | 2001040272 A | 2/2001 |
| JP | 2001040319 A | 2/2001 |
| JP | 2001278923 A | 10/2001 |
| JP | 2002088215 A | 3/2002 |
| JP | 2005264136 A | 9/2005 |
| JP | 2006056973 A | 3/2006 |
| JP | 20081779 A | 1/2008 |
| JP | 201053340 A | 3/2010 |
| JP | 201126463 A | 2/2011 |
| JP | 2014129484 A | 7/2014 |
| WO | WO-9529963 A1 * | 11/1995 ............ C08F 8/30 |
| WO | 9747401 A1 | 12/1997 |
| WO | 2011127641 A1 | 10/2011 |
| WO | 2015030955 A1 | 3/2015 |
| WO | 2017158015 A1 | 9/2017 |
| WO | 2017160398 A1 | 9/2017 |
| WO | 2017180220 A1 | 10/2017 |

OTHER PUBLICATIONS

Zhang et al., "The Diacetone Acrylamide Crosslinking Reaction and Its Control of Core-Shell Polyacrylate Latices at Ambient Ternmperature", Journal of Applied Polymer Science, 2012, pp. 1822-1832, vol. 123.

"Binders for Architectural Coatings", Dow Coating Materials, 2016, 12 pages.

Vielhauer et al., "Self-Crosslinking Acrylic and Acrylic/ Polyurethane Resins for Waterborne Wood Finishes", Paint & Coatings Industry magazine, 2013, 8 pages.

* cited by examiner

COATING COMPOSITION COMPRISING SELF-CROSSLINKABLE CORE-SHELL PARTICLES AND IMPARTING IMPROVED STAIN RESISTANCE

FIELD OF THE INVENTION

The present invention relates to a coating composition having an aqueous dispersion of self-crosslinkable core-shell particles and a hydrophobic additive, a substrate coated therewith, and a method of improving stain resistance of a substrate.

BACKGROUND OF THE INVENTION

Coating compositions for outdoor substrates, such as those covering wood, concrete or stucco, and other coatings commonly become stained as the result picking up dirt and other materials from the surroundings. Stain resistance refers to the resistance to stain, difficulty of being wetted by stain, difficulty of being adhered to by stain, and/or easiness of stain removal without damage to the coating.

SUMMARY OF THE INVENTION

The present invention relates to a coating composition including: an aqueous dispersion of self-crosslinkable core-shell particles, where the core-shell particles include (1) a polymeric core at least partially encapsulated by (2) a polymeric shell having urethane linkages, keto and/or aldo functional groups, and hydrazide functional groups, where the polymeric core is covalently bonded to at least a portion of the polymeric shell, and a hydrophobic additive including a wax and/or a silicon-containing compound, where the hydrophobic additive is non-reactive with the polymeric core and the polymeric shell.

The present invention also relates to a method for improving stain resistance of a substrate including: preparing a coating composition by: preparing an aqueous dispersion of self-crosslinkable core-shell particles, where the core-shell particles include (1) a polymeric core at least partially encapsulated by (2) a polymeric shell having urethane linkages, keto and/or aldo functional groups, and hydrazide functional groups where the polymeric core is covalently bonded to at least a portion of the polymeric shell; and adding a hydrophobic additive including a wax and/or a silicon-containing compound to the aqueous dispersion; and applying the coating composition to a substrate.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" coating, "a" core-shell particle, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to a coating composition including: an aqueous dispersion of self-crosslinkable core-shell particles, wherein the core-shell particles comprise (1) a polymeric core at least partially encapsulated by (2) a polymeric shell. The polymeric shell comprises: (i) urethane linkages, (ii) keto and/or aldo functional groups, and (iii) hydrazide functional groups. The polymeric core is covalently bonded to at least a portion of the polymeric shell. The coating composition comprises a hydrophobic additive comprising a wax and/or a silicon-containing compound. The hydrophobic additive is non-reactive with the polymeric core and the polymeric shell.

As used herein, an "aqueous medium" refers to a liquid medium comprising more than 50 weight percent water, based on the total weight of the liquid medium. Such aqueous liquid media can comprise at least 60 weight percent water, or at least 70 weight percent water, or at least 80 weight percent water, or at least 90 weight percent water, or at least 95 weight percent water, or 100 weight percent water, based on the total weight of the liquid medium. The solvents that, if present, make up less than 50 weight percent of the liquid medium include organic solvents. Suitable organic solvents include polar organic solvents, e.g. protic organic solvents such as glycols, glycol ether alcohols, alcohols, volatile ketones, glycol diethers, esters, and diesters. Other suitable organic solvents include aromatic and aliphatic hydrocarbons.

Further, the term "self-crosslinkable" refers to a polymeric particle having two or more functional groups that are reactive with each other and which participate in intramolecular and/or intermolecular crosslinking reactions to form a covalent linkage in the absence of any external crosslinking agent. The polymeric particles of the present invention may each comprise hydrazide functional groups as well as a keto and/or aldo functional groups that can react with each other to yield hydrazone linkages. As used herein, a "crosslinking agent", "crosslinker", and like terms refers to a molecule comprising two or more functional groups that are reactive with other functional groups and which is capable of linking two or more monomers or polymer molecules through chemical bonds. It is appreciated that the self-crosslinkable core-shell particles can also react with separate crosslinking agents when present.

The aqueous dispersed (in an aqueous medium) core-shell particles of the coating composition each include a core that is at least partially encapsulated by the shell. The polymeric core may be an acrylic core that is partially bonded to a polyurethane/polyurea shell. The shell may include a water dispersible group, so as to be dispersible in the aqueous dispersion. A core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). It is appreciated that the first material(s) that forms the core is different from the second material(s) that forms the shell. Further, the core-shell particles can have various shapes (or morphologies) and sizes. The core-shell particles may have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size may be determined with a Zetasize 3000HS following the instructions in the Zetasize 3000HS manual.

The polymeric core typically comprises an addition polymer derived from ethylenically unsaturated monomers. The ethylenically unsaturated monomers can comprise a (meth)acrylate monomer, a vinyl monomer, or a combination thereof. As such, the polymeric core can comprise a (meth)acrylate polymer, a vinyl polymer, or a combination thereof. As used herein, the term "(meth)acrylate" refers to both the methacrylate and the acrylate. Moreover, the backbone, or main chain, of a polymer or polymers that form at least a portion of the polymeric shell can comprise urea linkages and/or urethane linkages and may optionally further comprise other linkages. The polymeric shell can comprise a polyurethane with a backbone that includes urethane linkages and urea linkages. As indicated, the polymeric shell can also comprise additional linkages including, but not limited to, ester linkages, ether linkages, and combinations thereof.

The polymeric core and/or polymeric shell comprises one or more, such as two or more, reactive functional groups. The term "reactive functional group" refers to an atom, group of atoms, functionality, or group having sufficient reactivity to form at least one covalent bond with another co-reactive group in a chemical reaction. At least some of the reactive functional groups of the polymeric shell are keto functional groups (also referred to as ketone functional groups) and/or aldo functional groups (also referred to as aldehyde functional groups) as well as hydrazide functional groups. Optionally, the polymeric core also comprises reactive functional groups such as keto functional groups, aldo functional groups, or combinations thereof. Alternatively, the polymer core is completely free (i.e., does not contain) of reactive functional groups such as keto functional groups and aldo functional groups.

Other suitable additional reactive functional groups that can be present on the polymeric shell and/or the polymeric core include, but are not limited to carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Suitable ethylenically unsaturated groups include, but are not limited to, (meth)acrylate groups, vinyl groups, and combinations thereof. It is appreciated that the polymeric shell, polymeric core, or both, can be completely free of (i.e., does not contain) any of the additional reactive functional groups.

The polymeric core and polymeric shell of the core-shell particles can be prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve more than 1 mass percent of the material in water or other aqueous-based mediums having a pH greater than 5 at ambient temperature (20° C.-27° C.). Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. Further, as used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often completely free of water-dispersible groups.

As indicated, the polymeric core and polymeric shell of the core-shell particles can be prepared to provide a hydrophilic polymeric shell with enhanced water-dispersibility/stability and a hydrophobic polymeric core. Thus, the polymeric shell can comprise hydrophilic water-dispersible groups while the polymeric core can be completely free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

As previously described, the water-dispersible groups comprise one or more hydrophilic functional groups. The polymer(s) that form the hydrophilic polymeric shell can comprise ionic or ionizable groups such as acid groups like carboxylic acid functional groups or salts thereof. Carboxylic acid functional group may be introduced by using a carboxylic acid group containing diol to form the polymeric shell. The acid groups such as carboxylic acid functional groups can be at least partially neutralized (i.e., at least 30% of the total neutralization equivalent) by an organic or inorganic base, such as a volatile amine, to form a salt group. A volatile amine refers as an amine compound having an initial boiling point of less than or equal to 250° C. as measured at a standard atmospheric pressure of 101.3 kPa. Suitable volatile amines include, but are not limited to, ammonia, dimethylamine, trimethylamine, monoethanolamine, and dimethylethanolamine. It is appreciated that the amines will evaporate during the formation of the coating to expose the acid groups such as carboxylic acid functional groups and allow the acid groups such as carboxylic acid functional groups to undergo further reactions such as with a crosslinking agent reactive with the acid groups or carboxylic acid functional groups. Other water-dispersible groups include polyoxyalkylene groups such as by using polyethylene/propylene glycol ether materials.

The polymeric shell may be formed from (i) polyurethanes comprising pendant and/or terminal keto and/or aldo functional groups as well as pendant and/or terminal carboxylic acid functional groups, and (ii) polyurethanes comprising pendant and/or terminal hydrazide functional groups as well as pendant and/or terminal carboxylic acid functional groups. As previously described, the carboxylic acid functional groups can be at least partially neutralized (i.e., at least 30% of the total neutralization equivalent) by an organic or inorganic base, such as a volatile amine, to form a salt group as previously described. Further, the polymeric core can be a hydrophobic core that is completely free of such carboxylic acid groups and salt groups formed therefrom. A "pendant group" refers to a group that is an offshoot from the side of the polymer backbone and which is not part of the polymer backbone. In contrast, a "terminal group" refers to a group on an end of the polymer backbone and which is part of the polymer backbone.

The polymeric shell may include a fluorine-containing group and/or a silicon-containing group bonded to the polymeric shell. The fluorine-containing group and/or the silicon-containing group may be co-polymerized with the polymeric core and also bonded to the polymeric shell. Fluorine-containing groups and/or a silicon-containing groups may include: fluorofunctional acrylate (methacrylate), such as: tridecafluoro octyl methacrylate, tridodecafluoro octyl methacrylate, and polydimethyl silicone acrylate (methacrylate) (such as those available in varying molecular weights from Shin-Etsu Chemical (Tokyo, Japan)). The fluorine-containing group and/or the silicon-containing group may be linearly bonded on the polymeric shell. Fluorine-containing groups and/or a silicon-containing groups may include: ethoxylated polydimethyl siloxane (e.g., SILSURF A008-UP from Siltech Corporation (Toronto, Canada)) and Capstone AL62 from The Chemours Company (Wilmington, Del.). Use of fluorine-containing groups and/or the silicon-containing groups may improve stain resistance of the coating formed from the coating composition due to their hydrophobic characteristics.

The polymeric shell is also covalently bonded to at least a portion of the polymeric core. The polymeric shell may be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the core-shell particles of the present invention. The core-shell particles can be formed from isocyanate functional polyurethane prepolymers, polyamines, hydrazide functional compounds, and ethylenically unsaturated monomers. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, hydrazide groups, and acid groups like carboxylic acid groups. A hydroxyl group may react with an isocyanate group to form a urethane linkage. A primary or secondary amine group may react with an isocyanate group to form a urea linkage. Suitable compounds that can be used to form the polyurethane include, but are not limited to, polyols, polyisocyanates, compounds containing one or more carboxylic acid groups, such as diols containing one or more carboxylic acid groups, polyamines, hydroxyl functional ethylenically unsaturated components, such as hydroxyalkyl esters of (meth)acrylic acid, and/or other compounds having reactive functional groups, such as hydroxyl groups, thiol groups, amine groups, and carboxylic acid groups. The polyurethane prepolymer can also be prepared with keto and/or aldo functional monoalcohols.

Suitable polyisocyanates include, but are not limited to, isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Polyols that can be used to prepare a polyurethane based polymer such as the polyurethane prepolymer include, but are not limited to, lower molecular weight glycols (less than 5,000 number average molecular weight (Mn)), polyether polyols, polyester polyols, copolymers thereof, and combinations thereof. As reported herein, Mn is measured by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da). Low molecular weight glycols include, but are not limited to, ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Suitable polyether polyols include, but are not limited to, polytetrahydrofuran, polyethylene glycol, polypropylene glycol, polybutylene glycol, and combinations thereof. Polyester polyols include those prepared from a polyol comprising an ether moiety and a carboxylic acid or anhydride.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof. Further, suitable amino alcohols that can be used include, but are not limited to, ethanolamine, propanolamine, butanolamine, and combinations thereof.

Suitable carboxylic acids, which can be reacted with the polyols to form a polyester polyol, include, but are not limited to, diacids such as glutaric acid, succinic acid, malonic acid, oxalic acid, phthalic acid, isophthalic acid, hexahydrophthalic acid, adipic acid, maleic acid, and mixtures thereof. Suitable acid containing diols include, but are not limited to, 2,2-bis(hydroxymethyl)propionic acid, which is also referred to as dimethylolpropionic acid (DMPA), 2,2-bis(hydroxymethyl)butyric acid, which is also referred to as dimethylol butanoic acid (DMBA), diphenolic acid, and combinations thereof.

Suitable hydrazide functional materials that can be used in the preparation of the polyurethane prepolymer and to provide hydrazide functionality may include dihydrazide functional compounds such as, but not limited to, maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof.

Keto functional monoalcohols that can be used in the preparation of the polyurethane prepolymer and to provide keto and/or aldo functionality include, but are not limited to, hydroxyacetone, 4-hydroxy-2-butanone, 5-hydroxy-4-octanone, 4-hydroxy-4-methylpentan-2-one, which is also referred to as diacetone alcohol, 3-hydroxyacetophenone, and combinations thereof. Suitable aldo functional monoalcohols include, but are not limited to, DL-lactaldehyde solution, 3-hydroxy-butanal, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

Compounds, which can be used to incorporate ethylenically unsaturated moieties to the polyurethane prepolymer, include, but are not limited to, hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, and combinations thereof.

The components that form the polyurethane prepolymer can be reacted in a stepwise manner, or they can be reacted simultaneously. The polyurethane prepolymer can be formed by reacting a diisocyanate, a polyol, a carboxyl group-containing diol, a hydroxyl group-containing ethylenically unsaturated monomer, and a dihydrazide functional compound.

As previously mentioned, the core-shell particles can also be prepared with polyamines and ethylenically unsaturated monomers not incorporated into the polyurethane during preparation thereof. For instance, the isocyanate functional polyurethane prepolymers can be prepared as described above and then reacted with polyamines as a chain extender. As used herein, a "chain extender" refers to a lower molecular weight (compound having a Mn less than 1,000) compound having two or more functional groups that are reactive towards isocyanate.

Suitable polyamines that can be used to prepare the polyurethane based polymer include aliphatic and aromatic compounds, which comprise two or more amine groups selected from primary and secondary amine groups, including, but not limited to, diamines such as, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof. Suitable polyamines are also sold by Huntsman Corporation (The Woodlands, Tex.) under the trade name JEFFAMINE, such as JEFFAMINE D-230 and JEFFAMINE D-400.

Other suitable polyamine functional compounds include, but are not limited to, the Michael addition reaction products of a polyamine functional compound, such as a diamine, with keto and/or aldo containing ethylenically unsaturated monomers. The polyamine functional compound typically comprises at least two primary amino groups (i.e., a functional group represented by the structural formula —NH$_2$), and the keto and/or aldo containing unsaturated monomers include, but are not limited to, (meth)acrolein, diacetone (meth)acrylamide, diacetone (meth)acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbonyl) and at least two keto and/or aldo functional groups. It is appreciated that the secondary amino groups will react with the isocyanate functional groups of the polyurethane prepolymers to form urea linkages and chain extend the polyurethanes. Further, the keto and/or aldo functional groups will extend out from the backbone of the chain-extended polyurethane, such as from the nitrogen atom of the urea linkage to form a polyurethane with pendant keto and/or aldo functional groups.

As indicated, and in accordance with the present invention, the aqueous dispersion includes core-shell particles that have a polymeric shell comprising keto and/or aldo functional groups as well as hydrazide functional groups. The polymeric shell of such core-shell particles can be prepared with hydrazide functional polymers and keto and/or aldo functional polymers or polymers that contain both hydrazide functionality and keto and/or aldo functionality. The polymers can also include additional functional groups as previously described including, but not limited to, ethylenically unsaturated groups. The polymeric shell of such core-shell particles can be prepared with: (i) a first polyurethane comprising urethane linkages, water-dispersible groups such as carboxylic acid groups, ethylenically unsaturated groups, and hydrazide groups; and (ii) a second polyurethane comprising urethane linkages, water-dispersible groups such as carboxylic acid groups, ethylenically unsaturated groups, keto and/or aldo groups, and, optionally, urea linkages.

Moreover, the first and second polyurethanes can be prepared with the previously described components. The first polyurethane can be prepared by reacting an isocyanate and ethylenically unsaturated functional polyurethane with a dihydrazide functional compound such as adipic acid dihydrazide. The second polyurethane can be prepared by reacting and chain extending isocyanate and ethylenically unsaturated functional polyurethanes with the Michael addition reaction product of a diamine and keto and/or aldo containing ethylenically unsaturated monomers. The isocyanate and ethylenically unsaturated functional polyurethanes used to form the first and second polyurethanes can be formed from polyols, polyisocyanates, diols containing carboxylic acid functionality, and hydroxyl functional ethylenically unsaturated components.

After forming the polyurethane(s) (e.g., the first and second polyurethanes previously described), the polyurethane(s) and additional ethylenically unsaturated monomers can be subjected to a polymerization process to form the core-shell particles. The additional ethylenically unsaturated monomers can be added after forming the polyurethane(s). Alternatively, the additional ethylenically unsaturated monomers can be used as a diluent during preparation of the polyurethane(s) and not added after formation of the polyurethane(s). It is appreciated that ethylenically unsaturated monomers can be used as a diluent during preparation of the polyurethane(s) and also added after formation of the polyurethane(s).

The additional ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Suitable ethylenically unsaturated monomers include, but are not limited to, alkyl esters of (meth)acrylic acid, hydroxyalkyl esters of (meth)acrylic acid, acid group containing ethylenically unsaturated monomers, vinyl aromatic monomers, aldo or keto containing ethylenically unsaturated monomers, and combinations thereof.

Suitable alkyl esters of (meth)acrylic acid include, but are not limited to, methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other alkyl esters include di(meth)acrylate alkyl diesters formed from the condensation of two equivalents of (meth)acrylic acid and a diol such as, ethylene glycol di(meth)acrylate. Di(meth)acrylate alkyl diesters formed from $C_{2-24}$ diols such as butane diol and hexane diol can also be used.

Suitable hydroxyalkyl esters of (meth)acrylic acid and keto and aldo containing ethylenically unsaturated monomers include, but are not limited to, any of those previously described. Suitable acid group containing ethylenically unsaturated monomers include, but are not limited to, (meth)acrylic acid, itaconic acid, maleic acid, fumaric acid, crotonic acid, aspartic acid, malic acid, mercaptosuccinic acid, and combinations thereof.

Suitable vinyl aromatic monomers include, but are not limited to, styrene, 2,4-dimethylstyrene, ethylstyrene, isopropylstyrene, butylstyrene, vinyl naphthalene, vinyl toluene, divinyl aromatic monomers, such as divinyl benzene, and combinations thereof.

As previously noted, the ethylenically unsaturated monomers can be polymerized in the presence of the polyurethane(s), which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

The core-shell particles of the present invention may be prepared with: (i) ethylenically unsaturated monomers; (ii) a first polyurethane comprising urethane linkages, carboxylic acid groups, ethylenically unsaturated groups, and hydrazide groups; and (iii) a second polyurethane comprising urethane linkages, urea linkages, carboxylic acid groups, ethylenically unsaturated groups, and keto and/or aldo groups. The resulting core-shell particles then comprise a polymeric core prepared from ethylenically unsaturated monomers and may include an addition polymer formed by free radical polymerization from a monomer component that may comprise any of the ethylenically unsaturated monomers previously mentioned, that is covalently bonded to at least a portion of a polyurethane shell having pendant carboxylic acid functional groups, pendant or terminal keto and/or aldo functional groups, hydrazide functional groups, urethane linkages, and urea linkages. For enhanced water-dispersibility/stability, the carboxylic acid functional groups on the polymeric shell can be at least partially neutralized (i.e., at least 30% of the total neutralization equivalent) by an organic or inorganic base, such as a volatile amine, to form a salt group as previously described. The polymeric core can also include pendant and/or terminal functional groups, such as keto and/or aldo functional groups, by using ethylenically unsaturated monomers that contain additional functional groups such as acid group containing ethylenically unsaturated monomers and/or aldo or keto containing ethylenically unsaturated monomers as indicated above. Alternatively, the polymeric core can be completely free of additional functional groups such as completely free of keto and/or aldo functional groups. Further, the polymeric core is covalently bonded to at least a portion of the polymeric shell after polymerization of the monomers and polyurethane(s).

The polymeric core of the core-shell particle may have a Tg of from 10° C. to 30° C., such as from 10° C. to 20° C., from 20° C. to 30° C., from 15° C. to 30° C., or from 15° C. to 25° C., as measured by differential scanning calorimetry according to ASTM D3418-15. The Tg referred to in this paragraph refers to the Tg of the polymeric core of the core-shell particle before encapsulation by the polymeric shell.

It is appreciated that the core-shell particles described herein are dispersed in an aqueous medium to form a latex. As used herein, a "latex", with respect to the aqueous dispersed core-shell particles, refers to an aqueous colloidal dispersion of polymeric particles.

In addition to the above-described aqueous dispersion of self-crosslinkable core-shell particles, the coating composition includes a hydrophobic additive including wax and/or a silicon-containing compound. This hydrophobic additive may be non-reactive with the polymeric core and the polymeric shell of the self-crosslinkable core-shell particles.

The coating composition including the self-crosslinkable core-shell particles and the hydrophobic additive may include the self-crosslinkable core-shell particles in an amount of at least 60 weight percent, at least 70 weight percent, or at least 80 weight percent of the coating composition, based on total solids weight of the coating composition. The self-crosslinkable core-shell particles can include up to 90 weight percent, up to 80 weight percent, or up to 70 weight percent of the coating composition, based on total solids weight of the coating composition. The self-crosslinkable core-shell particles can also be included in the coating composition in a range such as from 60 to 90 weight percent, or from 65 to 90 weight percent, or from 70 to 90 weight percent, or from 75 to 90 weight percent, or from 75 to 80 weight percent, or from 70 to 80 weight percent, or from 60 to 80 weight percent of the coating composition, based on total solids weight of the coating composition.

The coating composition including the self-crosslinkable core-shell particles and the hydrophobic additive may include the hydrophobic additive in an amount of at least 10 weight percent, at least 20 weight percent, or at least 30 weight percent of the coating composition, based on total solids weight of the coating composition. The hydrophobic additive can include up to 40 weight percent, up to 30 weight percent, or up to 20 weight percent of the coating composition, based on total solids weight of the coating composition. The hydrophobic additive can also be included in the coating composition in a range such as from 10 to 40 weight percent, or from 15 to 40 weight percent, or from 20 to 40 weight percent, or from 25 to 40 weight percent, or from 25 to 30 weight percent, or from 20 to 30 weight percent, or from 10 to 30 weight percent of the coating composition, based on total solids weight of the coating composition.

The hydrophobic additive may include a wax or lubricant. A wax may be defined as a lipid made up of a chain of alkanes or esters from alcohols and fatty acids. The wax may include an anionic polyethylene and/or paraffin emulsion. The wax may include an unfiltered paraffin wax. Non-limiting commercial examples of the hydrophobic wax or lubricant include, but are not limited to: SLIP-AYD SL 18, SLIP-AYD SL 1606, SLIP-AYD SL-300 (Elementis Specialties (London, England)); MICHEMLUBE 368, MICHEMLUBE 743, MICHEMLUBE 511, MICHEM Emulsion 39235 (Michelman, Inc. (Cincinnati, Ohio)); POLIGEN ES 91009, POLIGEN ES 91012 (BASF (Ludwigshafen, Germany)); SUNPAR 110 (HollyFrontier Corporation (Dallas, Tex.)); and AQUACER 539 (BYK Chemie GmbH (Wesel, Germany)).

The hydrophobic additive may include a silicon-containing compound. The silicon-containing compound may include a polysiloxane modified with a functional silicone resin. Non-limiting commercial examples of the silicon-containing compound include, but are not limited to: SILRES BS 1306, SILRES BS 50, SILRES BS 1340, SILRES WH (Wacker Chemie AG (Munich, Germany)); and BYK-333, BYK-321 (BYK Chemie GmbH (Wesel, Germany)).

The coating composition may optionally also comprise additional components. The coating composition can also comprise non-self-crosslinkable core-shell particles. As used herein, "non-self-crosslinkable" refers to a polymeric particle having one or more functional groups that are not reactive with each other and which thus requires one or more external crosslinking agents to undergo a crosslinking reaction. The non-self-crosslinkable core-shell particles may include a polymeric core comprising: (i) residues from ethylenically unsaturated monomers such as (meth)acrylate monomers, vinyl monomers, or a combination thereof and therefore comprise an addition polymer such as a (meth)acrylate polymer, a vinyl polymer, or a combination thereof; and (ii) keto and/or aldo functional groups. Moreover, the backbone or main chain of the polymer(s) that forms at least a portion of the polymeric shell can comprise urethane linkages and, optionally, other linkages such as ester linkages, ether linkages, and combinations thereof. Thus, the polymeric core can comprise keto and/or aldo functional groups, and the polymeric shell can comprise a polyurethane(s) that is completely free of keto and/or aldo functional groups and, optionally, completely free of urea linkages. Further, both the polymeric core and the polymeric shell may be completely free of hydrazide functional groups. It is appreciated that such non-self-crosslinkable core-shell particles can be prepared with similar materials as described above with respect to the self-crosslinkable core-shell particles.

The non-self-crosslinkable core-shell particles can also include a polymeric core comprising an addition polymer such as a (meth)acrylate polymer, a vinyl polymer, or a combination thereof that is derived from ethylenically unsaturated monomers such as (meth)acrylate monomers, vinyl monomers, or a combination thereof, and a polymeric shell comprising urethane linkages, water-dispersible groups such as carboxylic acid groups, ethylenically unsaturated groups, keto and/or aldo groups, and, optionally, urea linkages. Moreover, the backbone or main chain of the polymer(s) that forms at least a portion of the polymeric shell can, optionally, comprise other linkages such as ester linkages, ether linkages, and combinations thereof. The resulting core-shell particles then comprise a polymeric core prepared from ethylenically unsaturated monomers that is covalently bonded to at least a portion of a polyurethane shell having pendant carboxylic acid functional groups, pendant or terminal keto and/or aldo functional groups, urethane linkages, and, optionally, urea linkages. For enhanced water-dispersibility/stability, the carboxylic acid functional groups on the polymeric shell can be at least partially neutralized (i.e., at least 30% of the total neutralization equivalent) by an organic or inorganic base, such as a volatile amine, to form a salt group as previously described. The polymeric core can also include pendant and/or terminal functional groups, such as keto and/or aldo functional groups, by using ethylenically unsaturated monomers that contain additional functional groups as discussed above with respect to the self-crosslinkable core-shell particles. Alternatively, the polymeric core can be completely free of additional functional groups such as keto and/or aldo functional groups. Further, both the polymeric core and the polymeric shell can be completely free of hydrazide functional groups. It is appreciated that such core-shell particles can be prepared with similar materials as described above with respect to the self-crosslinkable core-shell particles.

The non-self-crosslinkable core-shell particles can comprise at least 0.1 weight percent, at least 1 weight percent, at least 2 weight percent, at least 5 weight percent, or at least 10 weight percent of the resin blend, based on total resin solids weight. The non-self-crosslinkable core-shell particles can comprise up to 40 weight percent, up to 30 weight percent, or up to 20 weight percent of the resin blend, based on total resin solids weight. The non-self-crosslinkable core-shell particles can also comprise a range such as from 0.1 to 40 weight percent, or from 1 to 30 weight percent, or from 2 to 20 weight percent of the resin blend, based on total resin solids weight.

The coating composition can also comprise one or more crosslinkers. For instance, the coating composition according to the present invention may comprise at least one crosslinker that is reactive with the functionality on the non-self crosslinkable core-shell particles described above and/or the optional additional film-forming resins further described herein. Suitable crosslinkers include, but are not limited to, polyhydrazides, carbodiimides, polyols, phenolic resins, epoxy resins, beta-hydroxy (alkyl) amide resins, hydroxy (alkyl) urea resins, oxazolines, alkylated carbamate resins, (meth)acrylates, isocyanates, blocked isocyanates, polyacids, anhydrides, organometallic acid-functional materials, polyamines, polyamides, aminoplasts, aziridines, and combinations thereof.

The crosslinker(s) can react with the core-shell particles to help cure the coating composition. The terms "curable", "cure", and the like, mean that at least a portion of the resinous materials in a composition is crosslinked or crosslinkable. Cure, or the degree of cure, can be determined by dynamic mechanical thermal analysis (DMTA) using a Polymer Laboratories MK III DMTA analyzer conducted under nitrogen. The degree of cure can be at least 10%, such as at least 30%, such as at least 50%, such as at least 70%, or at least 90% of complete crosslinking as determined by the analysis mentioned above.

Further, curing can occur at ambient conditions, with heat, or with other means such as actinic radiation. "Ambient conditions" as used herein refers to the conditions of the surrounding environment such as the temperature, humidity, and pressure of the room or outdoor environment. The coating composition can be cured at ambient room temperature (e.g., 20° C.-27° C.) within 24 hours. Further, the term "actinic radiation" refers to electromagnetic radiation that can initiate chemical reactions. Actinic radiation includes, but is not limited to, visible light, ultraviolet (UV) light, infrared and near-infrared radiation, X-ray, and gamma radiation.

The coating composition can comprise at least one crosslinker that is reactive with: (i) the keto and/or aldo functional groups or the hydrazide functional groups on the polymeric shell of the self-crosslinkable core-shell particles; and/or (ii) the keto and aldo functional groups on the polymeric core and/or shell of the non-self-crosslinkable core-shell particles when present. The crosslinker can also react with functional groups such as keto and aldo functional groups that can be present on the polymeric core of the self-crosslinkable core-shell particles. For instance, the coating composition can comprise a polyhydrazide that is reactive with the keto and/or aldo functional groups on the polymeric shell of the non-self-crosslinkable core-shell particles and keto and/or aldo functional groups on the polymeric shell of the self-crosslinkable core-shell particles. The polyhydrazides can include non-polymeric polyhydrazides, polymeric polyhydrazides, or combinations thereof. Suitable non-polymeric polyhydrazides may include the dihydrazide functional compounds previously described.

The polymeric polyhydrazides can include various types of polymers comprising two or more hydrazide functional groups. The polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can be prepared by reacting polyols, isocyanates, and, optionally, compounds containing carboxylic acids such as diols containing carboxylic acid groups, and/or polyamines. These compounds may include any of those previously described with respect to the polyurethane prepolymer of the core-shell particles.

It is appreciated that the isocyanate functional polyurethane prepolymer used to prepare the polyhydrazide functional polyurethane can include additional functional groups. The isocyanate functional polyurethane prepolymer can also include any of the reactive functional groups previously described such as carboxylic acid groups that can be at least partially neutralized by an organic or inorganic base to form a salt group and enhance the water-dispersibility/stability of the polyurethane. The polyurethane prepolymer can also be completely free of any of the additional functional groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with one or more hydrazine and/or polyhydrazide compound(s) to form a water-dispersible polyhydrazide functional polyurethane. The hydrazine and polyhydrazide compounds can also chain extend the isocyanate functional polyurethane prepolymer. Suitable polyhydrazide compounds that can be reacted with the isocyanate functional polyurethane prepolymer include any of the non-polymeric hydrazide functional compounds previously described.

The polymeric polyhydrazides can also comprise core-shell particles comprising a polymeric core at least partially encapsulated by a polymeric shell having two or more hydrazide functional groups. The polyhydrazide functional core-shell particles may be prepared by reacting polyurethane prepolymers having isocyanate and ethylenically unsaturated functional groups with hydrazine and/or polyhydrazide compounds and ethylenically unsaturated monomers and/or polymers. The polyhydrazide functional core-shell particles may be prepared by reacting polyurethane prepolymers having isocyanate and ethylenically unsaturated groups with hydrazine and/or polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from ethylenically unsaturated monomers and/or polymers that are covalently bonded to at least a portion of a polyurethane shell having hydrazide functional groups and urethane linkages. The polymeric shell can also comprise additional functional groups (e.g., carboxylic acid functional groups) and/or linkages (e.g., ester linkages and/or ether linkages) as previously described with respect to polyurethane shells. The hydrazide functional core-shell particles can be also completely free of additional functional groups and linkages such as any of those previously described herein. It is appreciated that the hydrazide functional core-shell particles that can be used as a crosslinker are completely free of keto and aldo functional groups.

The coating composition can also comprise at least two different types of crosslinkers that are reactive with the functional groups that may be present on the core-shell particles such as keto and/or aldo functional groups, hydrazide groups and/or carboxylic acid functional groups. The coating composition may comprise a polyhydrazide reactive with the keto and/or aldo functional group, such as any of those previously described, and a carbodiimide reactive with carboxylic acid functional groups. Some suitable carbodiimides are described in U.S. Patent Application Publication No. 2011/0070374 at paragraphs [0006] to [0105], which is incorporated by reference herein.

In addition, the coating composition can comprise additional materials including, but not limited to, additional resins such as additional film-forming resins. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material such as the core-shell particles and additional resins described herein. The coating composition comprising the additional resin can be dehydrated and/or cured at ambient conditions within 24 hours, with heat, or with other means such as actinic radiation as previously described.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Suitable additional resins may include polyurethanes other than those previously described, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. The crosslinkers can include any of those previously described. Alternatively, a thermosetting film-forming resin can be used having functional groups that are reactive with themselves; in this manner, such thermosetting resins are self-crosslinking.

The coating composition may further include a mildew-preventing additive. As used herein a mildew-preventing additive is defined as a biocide which inhibits the growth of mold, mildew, algae, bacteria, or some combination thereof on the surface of the cured coating to which it has been added (to the coating composition that forms the coating).

The coating composition can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

The colorants may include pigments (organic or inorganic), dyes, and tints, such as those used in the paint industry and/or listed in the Dry Color Manufacturers Association (DCMA), as well as special effect compositions. A colorant may include a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Suitable pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Suitable dyes include, but are not limited to, those that are solvent and/or aqueous based such as phthalo green or blue, iron oxide, and bismuth vanadate.

Suitable tints include, but are not limited to, pigments dispersed in water-based or water miscible carriers such as AQUA-CHEM 896 commercially available from Evonik Industries (Essen, Germany), CHARISMA COLORANTS and MAXITONER INDUSTRIAL COLORANTS commercially available from Accurate Dispersions Division of Eastman Chemical, Inc. (Kingsport, Tenn.).

The colorant which can be used with the coating composition of the present invention can also comprise a special effect composition or pigment. As used herein, a "special effect composition or pigment" refers to a composition or pigment that interacts with visible light to provide an appearance effect other than, or in addition to, a continuous unchanging color. Suitable special effect compositions and pigments may include those that produce one or more appearance effects such as reflectance, pearlescence, metallic sheen, texture, phosphorescence, fluorescence, photochromism, photosensitivity, thermochromism, goniochromism, and/or color-change. Special effect compositions can include transparent coated mica and/or synthetic mica, coated silica, coated alumina, aluminum flakes, a transparent liquid crystal pigment, a liquid crystal coating, and combinations thereof.

The coating composition may include a rheology modifier to adjust the viscosity of the coating composition to a desired level. The rheology modifier may be a non-associative rheology modifier, such as an inorganic additive (e.g., clays) and hydroxyethyl cellulose (HEC). The rheology modifier may be an associative rheology modifier, such as a hydrophobically-modified ethylene oxide based urethane (HEUR) or a hydrophobically-modified alkali soluble emulsion (HASE). The coating composition may have a Stormer viscosity between 40-120 KU (as measured according to ASTM D562) and/or an ICI viscosity between 0.1-5 P (as measured according to ASTM D4287).

Further materials that can optionally be used with the coating composition of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

The coating composition of the present invention, when applied to a substrate and dried to form a coating, may improve stain resistance of the coating compared to the same coating composition that does not include the self-crosslinkable core-shell particles. The stain resistance of the cured coating may be defined as described in the test method provided in the below examples, and the stain resistance of the cured coating may be such that the cured coating exhibits a $\Delta E$ of no more than 10, such as no more than 7.5, no more than 7, no more than 6, or no more than 5 after an iron oxide slurry is applied to the coating to form a stain on the coating, air dried for four hours, and washed with soap and water until no more stain can be removed.

The present invention is also directed to a method of improving stain resistance of a substrate with the coating composition described herein compared to the same coating composition that does not include the self-crosslinkable core-shell particles. The method includes applying the coating composition described herein over at least a portion of the substrate. The coating composition can be applied in liquid form and dried, such as at temperature conditions in the range of −10° C. to 50° C.

Formulation of the coating composition involves the process of selecting and admixing appropriate coating ingredients in the correct proportions to provide a paint with specific processing and handling properties, as well as a final dry paint film with the desired properties. The coating composition may be applied to a substrate by conventional application methods such as brushing, roller application, and spraying methods such as air-atomized spray, air-assisted spray, airless spray, high volume low pressure spray, and air-assisted airless spray.

Suitable substrates include, but are not limited to, architectural substrates, such as metallic or non-metallic substrates including: concrete, stucco, cement board, MDF (medium density fiberboard) and particle board, gypsum board, wood, stone, metal, plastics, wall paper, textile, plaster, fiberglass, ceramic, etc., which may be pre-primed by waterborne or solvent borne primers. The architectural substrate may be wood, concrete, and/or stucco exposed to outdoor conditions. When applied to a substrate and dried to form a coating thereon, it has been found that the dried coating containing both the self-crosslinkable core-shell particles and the hydrophobic additive imparts improved stain resistance.

The substrate may include a base layer disposed beneath the coating formed from the coating composition. The base layer may be a weathered coating layer. As used herein, a weathered coating layer is defined as a coating layer that has been exposed to an outdoor environment for an extended period of time, such as at least 3 months, at least 6 months, at least 1 year, at least 2 years, or at least 5 years. As such, the coating formed from the coating composition, which is disposed over the weathered coating layer may be defined as a refinish coating layer (e.g., coating layer disposed over a weathered coating layer after a predefined time period).

EXAMPLES

The following examples are presented to demonstrate the general principles of the invention. The invention should not be considered as limited to the specific examples presented. All parts and percentages in the examples are by weight unless otherwise indicated.

Example 1

Preparation of Core-Shell Particle Latex

Part A: A polyurethane was first prepared by charging the following components in order into a four necked round bottom flask fitted with a thermocouple, mechanical stirrer, and condenser: 113 grams of butyl methacrylate, 4 grams trimethylol propane, 8.7 grams of hydroxyethyl methacrylate (HEMA), 0.7 grams of 2,6-di-tert-butyl 4-methyl phenol, 91 grams of FOMREZ 66-56 (hydroxyl terminated saturated linear polyester polyol, commercially available from Chemtura Corporation (Philadelphia, Pa.)), 91 grams POLYMEG 2000 (available from Lyondell Basell Industries Holdings, B.V. (Rotterdam, Netherlands)) and 35 grams of dimethyol propionic acid (DMPA). The mixture was heated to 50° C. and held for 15 minutes. After heating the mixture, 160 grams of isophorone diisocyanate was charged into the flask over 10 minutes and mixed for 15 minutes. Next, 8.2 grams of butyl acrylate 1.3 grams triethylamine and 0.34 grams of dibutyl tin dilaurate (DBTDL) was charged into the flask. Immediate exotherm was observed. After exotherm subsided, the mixture was heated to 90° C. and held for 60 minutes. The mixture was then cooled to 70° C., and 80 grams of butyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 500 grams of deionized water, 26 grams of diacetone acrylamide and 6.5 grams of ethylenediamine. The mixture was heated to 70° C. and held for 2 hours with an $N_2$ blanket. After heating the mixture, 26.0 grams adipic dihydrazide, 14.4 grams ammonium hydroxide, 2.2 grams ethylenediamine, 8.0 grams AEROSOL OT (available from Cytec Solvay Group (Woodland Park, N.J.)) and 450 grams of deionized water charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate, 1.0 gram of 70% butylhydroperoxide, and 40 grams of deionized water was charged into the flask. Following that, 1.2 grams sodium metabisulfite and 40 grams deionized water was charged over 30 minutes. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 36.7%.

Example 2

Preparation of Core-Shell Particle Latex

Part A: A polyurethane was first prepared by charging the following components in order into a four necked round bottom flask fitted with a thermocouple, mechanical stirrer, and condenser: 113 grams of butyl methacrylate, 4 grams trimethylol propane, 8.7 grams of hydroxyethyl methacrylate (HEMA), 0.7 grams of 2,6-di-tert-butyl 4-methyl phenol, 182 grams of FOMREZ 44-56 (hydroxyl terminated saturated linear polyester polyol, commercially available from Chemtura Corporation (Philadelphia, Pa.)), 1.3 grams of triethylamine, and 35 grams of dimethyol propionic acid (DMPA). The mixture was heated to 50° C. and held for 15 minutes. After heating the mixture, 160 grams of isophorone diisocyanate was charged into the flask over 10 minutes and mixed for 15 minutes. Next, 8.2 grams of butyl methacrylate and 0.34 grams of dibutyl tin dilaurate (DBTDL) was charged into the flask Immediate exotherm was observed. After exotherm subsided, the mixture was heated to 90° C. and held for 60 minutes. The mixture was then cooled to 70° C., and 113 grams of methyl methacrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 500 grams of deionized water, 26 grams of diacetone acrylamide and 6.5 grams of ethylenediamine. The mixture was heated to 70° C. and held for 2 hours with an $N_2$ blanket. After heating the mixture, 1.5 grams of ethylenediamine 26.0 grams adipic dihydrazide, 14.4 grams of ammonium hydroxide, 8 grams of AEROSOL OT (available from Cytec Solvay Group (Woodland Park, N.J.)), and 450 grams of deionized water charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate, 0.1 gram of 1% ferrous ammonium sulfate (FAS), 1.0 gram of 70% butylhydroperoxide, and 40 grams of deionized water was charged into the flask. Following that, 1.2 grams sodium metabisulfite, 3 grams of ammonium hydroxide, and 40 grams deionized water was charged over 30 minutes. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 35.7%.

Example 3

Preparation of Core-Shell Particle Latex

Part A: A polyurethane was first prepared by charging the following components in order into a four necked round bottom flask fitted with a thermocouple, mechanical stirrer, and condenser: 113 grams of butyl acrylate, 4 grams trimethylol propane, 8.7 grams of hydroxyethyl methacrylate (HEMA), 0.7 grams of 2,6-di-tert-butyl 4-methyl phenol, 182 grams of FOMREZ 44-56 (hydroxyl terminated saturated linear polyester polyol, commercially available from Chemtura Corporation (Philadelphia, Pa.)), 1.3 grams of triethylamine, and 35 grams of dimethyol propionic acid (DMPA). The mixture was heated to 50° C. and held for 15 minutes. After heating the mixture, 160 grams of isophorone diisocyanate was charged into the flask over 10 minutes and mixed for 15 minutes. Next, 8.2 grams of butyl acrylate and 0.34 grams of dibutyl tin dilaurate (DBTDL) was charged into the flask Immediate exotherm was observed. After exotherm subsided, the mixture was heated to 90° C. and held for 60 minutes. The mixture was then cooled to 70° C., and 113 grams of butyl acrylate and 19.8 grams of hexanediol diacrylate were charged into the flask. The mixture was kept at 60° C. before being dispersed into water.

Part B: A latex comprising polyurethane-acrylic core-shell particles was prepared by first charging the following components into a four necked round bottom flask fitted with a thermocouple, mechanical stirrer, and condenser: 500 grams of deionized water, 26 grams of diacetone acrylamide and 6.5 grams of ethylenediamine. The mixture was heated to 70° C. and held for 2 hours with an $N_2$ blanket. After heating the mixture, 1.7 grams of ethylenediamine 26.0 grams adipic dihydrazide, 14.4 grams of ammonium hydroxide, 8 grams of AEROSOL OT (available from Cytec Solvay Group (Woodland Park, N.J.)), and 450 grams of deionized water charged into the flask and held at 50° C. for 15 minutes. Next, 520 grams of the polyurethane prepared in part A was dispersed into the flask over 20 minutes and mixed for an additional 15 minutes. A mixture of 0.5 gram of ammonium persulfate, 0.1 gram of 1% ferrous ammonium sulfate (FAS), 1.0 gram of 70% butylhydroperoxide, and 40 grams of deionized water was charged into the flask. Following that, 1.2 grams sodium metabisulfite, 3 grams of ammonium hydroxide, and 40 grams deionized water was charged over 30 minutes. After exotherm, the mixture was then held at 60° C. for an additional hour. After being cooled to 40° C., 0.2 grams of FOAMKILL 649 (non-silicone defoamer, commercially available from Crucible Chemical Company (Greenville, S.C.)), 3.0 grams of ACTICIDE MBS (microbiocide formed of a mixture of 1,2-benzisothiazolin-3-one and 2-methyl-4-isothiazolin-3-one, commercially available from Thor GmbH (Speyer, Germany)), and 5 grams of deionized water were charged and mixed for an additional 15 minutes. The resulting latex had a solid content of 35.7%.

Examples 4-7

Preparation of Coating Compositions

To form the coating compositions of Examples 4-6 and Comparative Example 7, the components from Table 1 were added into a single vessel using the following order of addition under medium agitation with a conventional high lift blade.

The tap water and NUOSEPT 95 were added, followed by approximately 5 minutes of mixing. The ROZONE 2000 was then added, followed by 5 minutes of mixing. The ethylene glycol was then added. An agitated sample of SILRES BS 1306 was then added, followed by at least 20 minutes of mixing. Next, the Latex from one of Examples 1-3 (for Examples 4-6) or the RHOPLEX 585 latex (for Comparative Example 7) was added, followed by the FOAMSTAR MO 2140. The ACTICIDE OTW 45 was then added. The composition was then mixed for at least another 10 minutes. The MICHEMLUBE 693 was then added. The composition was then agitated for 10 additional minutes to completion to form a coating composition.

TABLE 1

| Item description | Example 4 Mass (lb) | Example 5 Mass (lb) | Example 6 Mass (lb) | Comparative Example 7 Mass (lb) |
|---|---|---|---|---|
| Tap water | 75.94 | 75.94 | 75.94 | 75.94 |
| NUOSEPT 95[1] | 0.25 | 0.25 | 0.25 | 0.25 |
| ROZONE 2000[2] | 0.12 | 0.12 | 0.12 | 0.12 |
| Ethylene glycol | 0.44 | 0.44 | 0.44 | 0.44 |
| SILRES BS 1306[3] | 0.51 | 0.51 | 0.51 | 0.51 |
| Latex of Example 1 | 20.87 | — | — | — |
| Latex of Example 2 | — | 20.87 | — | — |
| Latex of Example 3 | — | — | 20.87 | — |
| RHOPLEX 585[4] | — | — | — | 20.87 |
| ACTICIDE OTW 45[5] | 0.17 | 0.17 | 0.17 | 0.17 |
| MICHEMLUBE 693[6] | 1.67 | 1.67 | 1.67 | 1.67 |
| FOAMASTER MO 2140[7] | 0.02 | 0.02 | 0.02 | 0.02 |

[1]A preservative commercially available from Ashland (Covington, KY)
[2]A biocide commercially available from Rohm and Haas Company (Philadelphia, PA)
[3]An emulsion of a polysiloxane modified with functional silicone resin commercially available from Wacker Chemie AG (Munich, Germany)
[4]An acrylic binder commercially available from Dow Chemical Company (Midland, MI)
[5]A microbiocide commercially available from Thor GmbH (Speyer, Germany)
[6]A wax emulsion commercially available from Michelman Inc. (Cincinnati, OH)
[7]A defoamer commercially available from BASF (Ludwigshafen, Germany)

The coating compositions of Examples 4-6 and Comparative Example 7 were then applied by foam brush to a previously coated and weathered basecoat system that was applied to pressure treated lumber (PTL). The basecoat/PTL system was weathered horizontally in Springdale Pa. for at least one year prior to applying the clear coating compositions of Examples 4-6 and Comparative Example 7. An acrylic oil transparent stain was applied over the basecoat/PTL system. The coating compositions of Examples 4-6 and Comparative Example 7 were applied over the acrylic oil transparent stain to form the substrate to be tested. Colorimetric values for the coated substrates were measured and stored using a MacBeth Color-eye Spectrophotometer.

The substrates were tested for stain resistance according to the following Stain Test Method. Using a foam brush, a uniform coating of Mapico Iron Oxide slurry was applied to the substrates. The Mapico Iron Oxide slurry was prepared using 250 grams of tap water, 2 drops of TAMOL 731 surfactant (commercially available from Rohm and Haas Company (Philadelphia, Pa.)), and 125 grams of Mapico 641 Iron Oxide Brown (commercially available from Rockwood Pigments (Beltsville, Md.)) stirred using a Cowles mixer for 15 minutes on high speed. The substrates coated with Mapico Iron Oxide slurry were left to dry at normal lab conditions for 4 hours. The substrates coated with the Mapico Iron Oxide slurry were washed with warm water and DAWN PROFESSIONAL Manual Pot and Pan Detergent dishwashing soap (available from Proctor and Gamble (Cincinnati, Ohio)) by rubbing with a wet soapy cheese cloth pad until no more stain can be removed. The DAWN PROFESSIONAL Manual Pot and Pan Detergent dishwashing soap is reported on the bottle as containing (CAS #): water (7732-18-5), sodium alkyl sulfate (68585-47-7), ethanol (64-17-5), sodium alkyl ethoxylate sulfate (68585-34-2), and amine oxide (70592-80-2). The washed substrates were then rinsed and left to dry. Colorimetric values were again taken for the substrates treated using this Stain Test Method using the MacBeth Color-eye Spectrophotometer, and a $\Delta E$ value between the coated substrate and the same coated substrate having undergone the Stain Test Method was determined. The $\Delta E$ value for the substrates coated with the coating compositions of Examples 4-6 and Comparative Example 7 are reported in Table 2 below.

TABLE 2

| Substrate | $\Delta E$ |
|---|---|
| Coated with Example 4 | 4.5 |
| Coated with Example 5 | 5.2 |
| Coated with Example 6 | 6.4 |
| Coated with Comparative Example 7 | 7.6 |

The substrate coated with the coating composition of Examples 4-6 had a lower $\Delta E$ compared to the substrate coated with the coating composition of Comparative Example 7, indicating that the coating resulting from the coating composition of Examples 4-6 imparted improved stain resistance compared to the coating resulting from the coating composition of Comparative Example 7.

The present invention further includes the subject matter of the following clauses:

Clause 1: A coating composition comprising: an aqueous dispersion of self-crosslinkable core-shell particles, wherein the core-shell particles comprise (1) a polymeric core at least partially encapsulated by (2) a polymeric shell comprising urethane linkages, keto and/or aldo functional groups, and hydrazide functional groups, wherein the polymeric core is covalently bonded to at least a portion of the polymeric shell, and a hydrophobic additive comprising a wax and/or a silicon-containing compound, wherein the hydrophobic additive is non-reactive with the polymeric core and the polymeric shell.

Clause 2: The coating composition of clause 1, wherein the polymeric core comprises an addition polymer derived from ethylenically unsaturated monomers.

Clause 3: The coating composition of clause 2, wherein the ethylenically unsaturated monomers comprise a (meth) acrylate monomer, a vinyl monomer, and/or a combination thereof.

Clause 4: The coating composition of any of clauses 1-3, wherein the polymeric shell comprises a water dispersible group.

Clause 5: The coating composition of any of clauses 1-4, wherein the core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

Clause 6: The coating composition of any of clauses 1-5, wherein the polymeric core is completely free of keto and/or aldo functional groups.

Clause 7: The coating composition of any of clauses 1-6, further comprising a mildew-preventing additive.

Clause 8: The coating composition of any of clauses 1-7, wherein the polymeric core has a Tg of 10° to 30° C.

Clause 9: The coating composition of any of clauses 1-8, wherein the hydrophobic additive comprises 1-35 weight percent based on total solids of the coating composition.

Clause 10: The coating composition of any of clauses 1-9, wherein when the coating composition is applied to a substrate and cured to form a coating, the cured coating exhibits a $\Delta E$ of no more than 10 after an iron oxide slurry is applied to the coating to form a stain on the coating, air dried for four hours, and washed with soap and water until no more stain can be removed.

Clause 11: A substrate at least partially coated with a coating formed from the coating composition of any of clauses 1-10.

Clause 12: The substrate of clause 11, wherein the substrate comprises wood, concrete, and/or stucco.

Clause 13: The substrate of clause 11 or 12, further comprising a base coating layer disposed beneath the coating formed from the coating composition.

Clause 14: The substrate of clause 13, wherein the coating layer formed from the coating composition comprises a refinish coating layer and the base coating layer comprises a weathered coating layer.

Clause 15: A method for improving stain resistance of a substrate comprising: preparing a coating composition by: preparing an aqueous dispersion of self-crosslinkable core-shell particles, wherein the core-shell particles comprise (1) a polymeric core at least partially encapsulated by (2) a polymeric shell comprising urethane linkages, keto and/or aldo functional groups, and hydrazide functional groups wherein the polymeric core is covalently bonded to at least a portion of the polymeric shell; and adding a hydrophobic additive comprising a wax and/or a silicon-containing compound to the aqueous dispersion; and applying the coating composition to the substrate.

Clause 16: The method of clause 15, wherein the coating composition is the coating composition of any of clauses 1-10.

Clause 17: The method of clause 15 or 16, wherein the substrate is the substrate of any of clauses 11-14.

Clause 18: The method of any one of clauses 15-17, further comprising applying the coating composition over a base coating layer, wherein the base coating layer comprises a weathered coating layer.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
   an aqueous dispersion of self-crosslinkable core-shell particles, wherein the core-shell particles comprise (1) a polymeric core at least partially encapsulated by (2) a polymeric shell comprising urethane linkages, keto and/or aldo functional groups, and hydrazide functional groups, wherein the polymeric core is covalently bonded to at least a portion of the polymeric shell, and
   a hydrophobic additive comprising a wax and/or a silicon-containing compound, wherein the hydrophobic additive is non-reactive with the polymeric core and the polymeric shell.

2. The coating composition of claim 1, wherein the polymeric core comprises an addition polymer derived from ethylenically unsaturated monomers.

3. The coating composition of claim 2, wherein the ethylenically unsaturated monomers comprise a (meth)acrylate monomer, a vinyl monomer, and/or a combination thereof.

4. The coating composition of claim 1, wherein the polymeric shell comprises a water dispersible group.

5. The coating composition of claim 1, wherein the core-shell particles are formed from a mixture of reactants comprising: (a) isocyanate-functional ethylenically unsaturated polyurethane prepolymers; (b) a Michael addition reaction product of ethylenically unsaturated monomers comprising a keto and/or aldo functional group, and a compound comprising at least two amino groups; (c) a hydrazide functional component; and (d) ethylenically unsaturated monomers.

6. The coating composition of claim 1, wherein the polymeric core is completely free of keto and/or aldo functional groups.

7. The coating composition of claim 1, further comprising a mildew-preventing additive.

8. The coating composition of claim 1, wherein the polymeric core has a Tg of 10° to 30° C.

9. The coating composition of claim 1, wherein the hydrophobic additive comprises 1-35 weight percent based on total solids of the coating composition.

10. The coating composition of claim 1, wherein when the coating composition is applied to a substrate and cured to form a coating, the cured coating exhibits a ΔE of no more than 10 after an iron oxide slurry is applied to the coating to form a stain on the coating, air dried for four hours, and washed with soap and water until no more stain can be removed.

11. The coating composition of claim 1, wherein the hydrophobic additive comprises the silicon-containing compound, wherein the silicone-containing compound comprises a polysiloxane modified with a functional silicone resin.

12. The coating composition of claim 1, wherein the polymeric shell comprises a silicon-containing group and/or a fluorine-containing group.

13. A substrate at least partially coated with a coating formed from the coating composition of claim 1.

14. The substrate of claim 13, wherein the polymeric core comprises an addition polymer derived from ethylenically unsaturated monomers, wherein the ethylenically unsaturated monomers comprise a (meth)acrylate monomer and/or a vinyl monomer.

15. The substrate of claim 13, wherein the substrate comprises wood, concrete, and/or stucco.

16. The substrate of claim 13, further comprising a base coating layer disposed beneath the coating formed from the coating composition.

17. The substrate of claim 16, wherein the coating layer formed from the coating composition comprises a refinish coating layer and the base coating layer comprises a weathered coating layer.

18. A method for improving stain resistance of a substrate comprising:
   preparing a coating composition by:
      preparing an aqueous dispersion of self-crosslinkable core-shell particles, wherein the core-shell particles comprise (1) a polymeric core at least partially encapsulated by (2) a polymeric shell comprising urethane linkages, keto and/or aldo functional groups, and hydrazide functional groups wherein the polymeric core is covalently bonded to at least a portion of the polymeric shell; and
      adding a hydrophobic additive comprising a wax and/or a silicon-containing compound to the aqueous dispersion; and
   applying the coating composition to a substrate.

19. The method of claim 18, wherein the substrate comprises wood, concrete, and/or stucco.

20. The method of claim 18, comprising applying the coating composition over a base coating layer, wherein the base coating layer comprises a weathered coating layer.

21. The method of claim 18, wherein the polymeric core comprises an addition polymer derived from ethylenically unsaturated monomers, wherein the ethylenically unsaturated monomers comprise a (meth)acrylate monomer, a vinyl monomer, and/or a combination thereof.

22. The method of claim 18, wherein when the coating composition is applied to the substrate and cured to form a coating, the cured coating exhibits a ΔE of no more than 10 after an iron oxide slurry is applied to the coating to form a stain on the coating, air dried for four hours, and washed with soap and water until no more stain can be removed.

* * * * *